United States Patent [19]
Clark et al.

[11] Patent Number: 5,811,137
[45] Date of Patent: Sep. 22, 1998

[54] DOUGH SHEETER HAVING INDEPENDANT INTERNALLY-DRIVEN SELF-POWERED ROLLERS

[75] Inventors: Donald B. Clark, Mission Viejo; Michael L. Herrera, Pomona, both of Calif.

[73] Assignee: Casa Herrera, Inc., Pomona, Calif.

[21] Appl. No.: 872,245

[22] Filed: Jun. 10, 1997

Related U.S. Application Data

[63] Continuation of Ser. No. 390,689, Feb. 17, 1995, abandoned.

[51] Int. Cl.$^6$ ..................................................... A21C 3/02
[52] U.S. Cl. ......................... 425/194; 425/363; 425/367; 100/168; 100/172; 100/176
[58] Field of Search ................................... 425/193, 197, 425/310, 363, 367; 100/168, 172, 176; 198/788; 492/15, 16

[56] References Cited

U.S. PATENT DOCUMENTS

| | | | |
|---|---|---|---|
| 1,825,119 | 9/1931 | Mug | 198/788 |
| 1,868,825 | 7/1932 | Grosjean | 198/788 |
| 1,881,267 | 10/1932 | Drexler | 198/788 |
| 2,950,507 | 8/1960 | Keyser | 19/65 R |
| 3,568,821 | 3/1971 | Gronkvist | 198/788 |
| 3,792,948 | 2/1974 | Martinez | 425/367 |
| 4,013,166 | 3/1977 | Weady et al. | 198/835 |
| 4,015,919 | 4/1977 | Pawelczyk | 425/367 |
| 4,082,180 | 4/1978 | Chung | 198/835 |
| 4,966,541 | 10/1990 | Mistretta | 425/229 |
| 5,018,960 | 5/1991 | Singer | 425/367 |
| 5,033,611 | 7/1991 | Huber | 198/788 |
| 5,088,596 | 2/1992 | Agnoff | 198/788 |
| 5,112,208 | 5/1992 | Voth | 425/363 |
| 5,116,448 | 5/1992 | Murayama et al. | 425/367 |
| 5,158,782 | 10/1992 | Hayashi et al. | 425/363 |
| 5,180,593 | 1/1993 | Mistretta et al. | 425/202 |
| 5,336,076 | 8/1994 | Waldherr et al. | 425/367 |
| 5,498,148 | 3/1996 | Ouellette et al. | 425/363 |
| 5,580,583 | 12/1996 | Caridis et al. | 425/363 |

OTHER PUBLICATIONS

Casa Herrera, Inc. flyer entitled "Magna 254 Sheeting Head" (Date Unknown).
Casa Herrera, Inc. flyer entitled "EOD –Extended Oven Discharge Conveyor With Drive (Length Optional)" (Date Unknown).
Casa Herrera, Inc. flyer entitled "Quad Head" (Date Unknown).
Casa Herrera, Inc. flyer entitled "Double Corn on Separate Stand" (Date Unknown).
"Corn Tortilla and Flour Tortilla Production Equipment", 1986, by Donald B. Clark, P.E., Technical Services Director, given before the Technology of Flour and Corn Tortillas Seminar of the American Institute of Baking, Manhattan, Kansas, Aug. 31 –Sep. 2, 1987.
Specifications for "Heavy–Duty Pancake Component Gear Sets", Harmonic Drive Technologies, 1992.
Specifications for 2800 and 9800 Series Ball Screw Actuater Units (Date Unknown).

*Primary Examiner*—James P. Mackey
*Attorney, Agent, or Firm*—Joseph C. Andras

[57] ABSTRACT

A sheeter head having a pair of counterrotating internally-driven sheeter rollers is disclosed. The sheeting rollers each include an independent internal drive motor and gear box affixed to a nonrotating shaft, along with a nonrotating idle shaft on an opposite end of the roller. The speeds of the drive motors are controlled by an external device such as an inverter speed control. The nonrotating shafts, in conjunction with the absence of any external drive mechanism, allow for sanitary operation, easy clean-up, and a simple and efficient adjustment mechanism for varying a pinch point between the rollers. The preferred adjustment mechanism includes a fixed front roller and horizontal slide plates connected to the axles of a back roller, the slide plate having pegs which slide in associated grooves. One of the grooves is preferably wider than the other to help prevent binding during an adjustment operation. The preferred sheeter head further includes a releasable connecting assembly so that the sheeter head may be decoupled from a discharger conveyor.

10 Claims, 8 Drawing Sheets

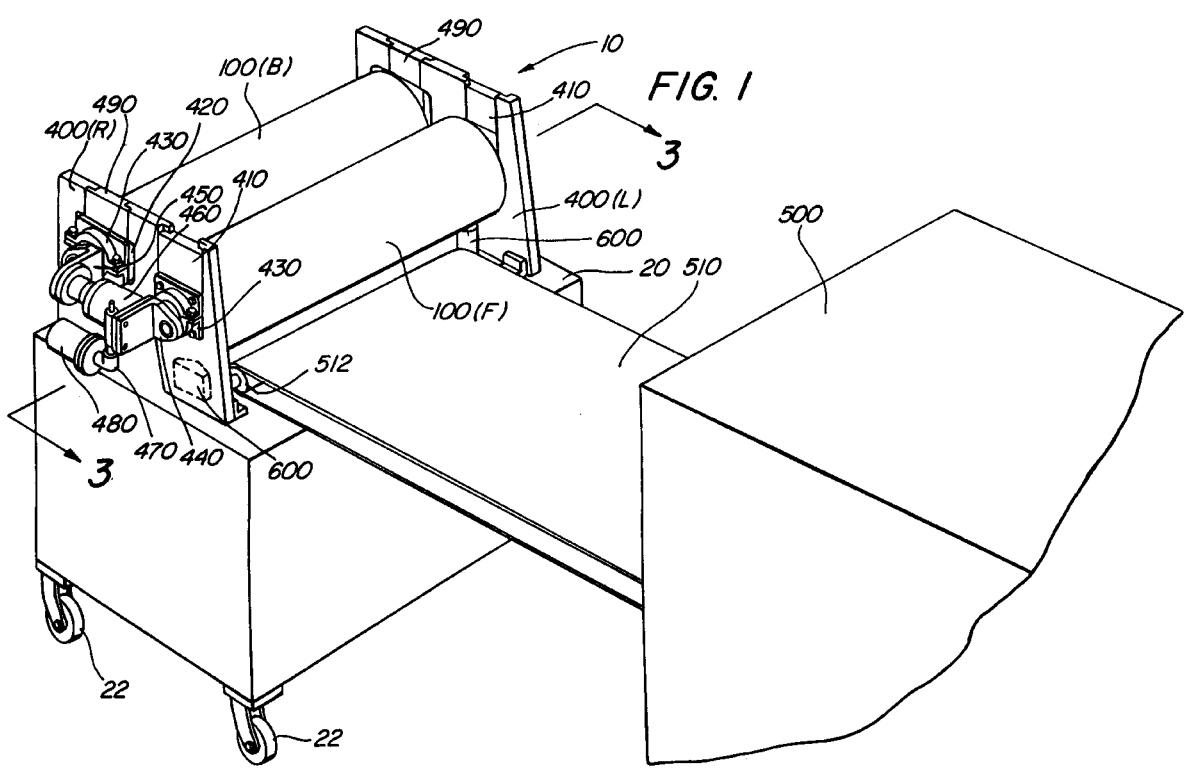

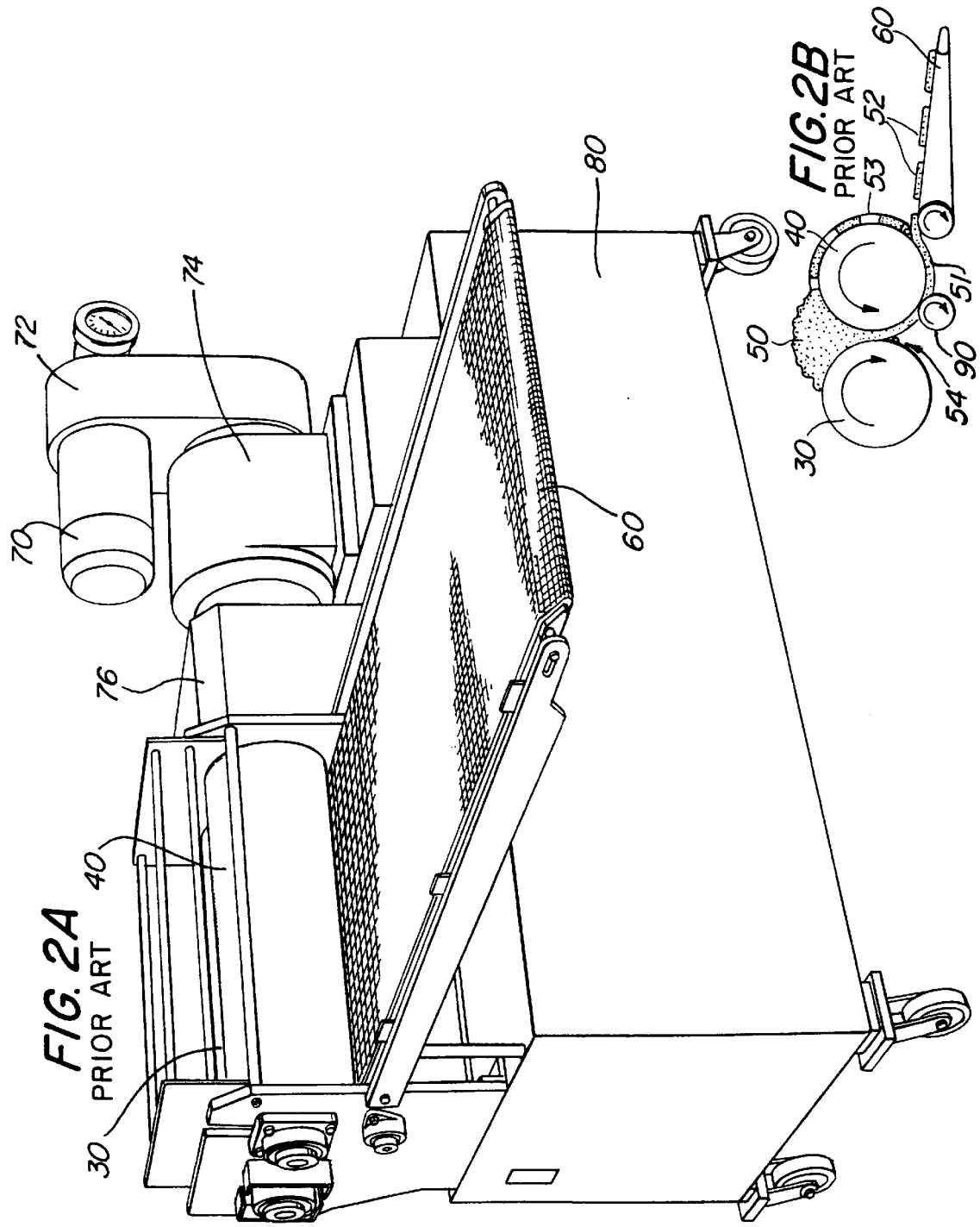

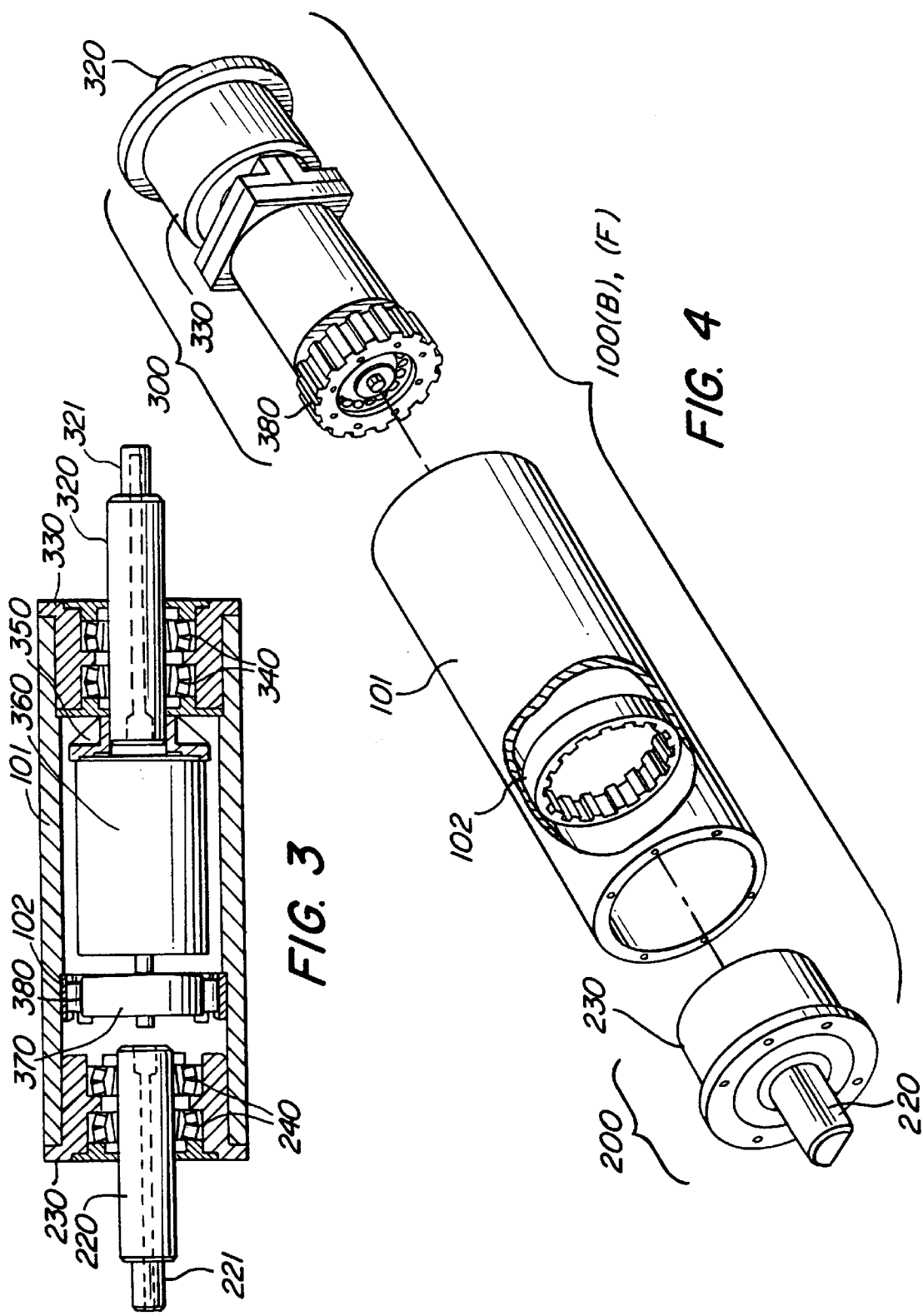

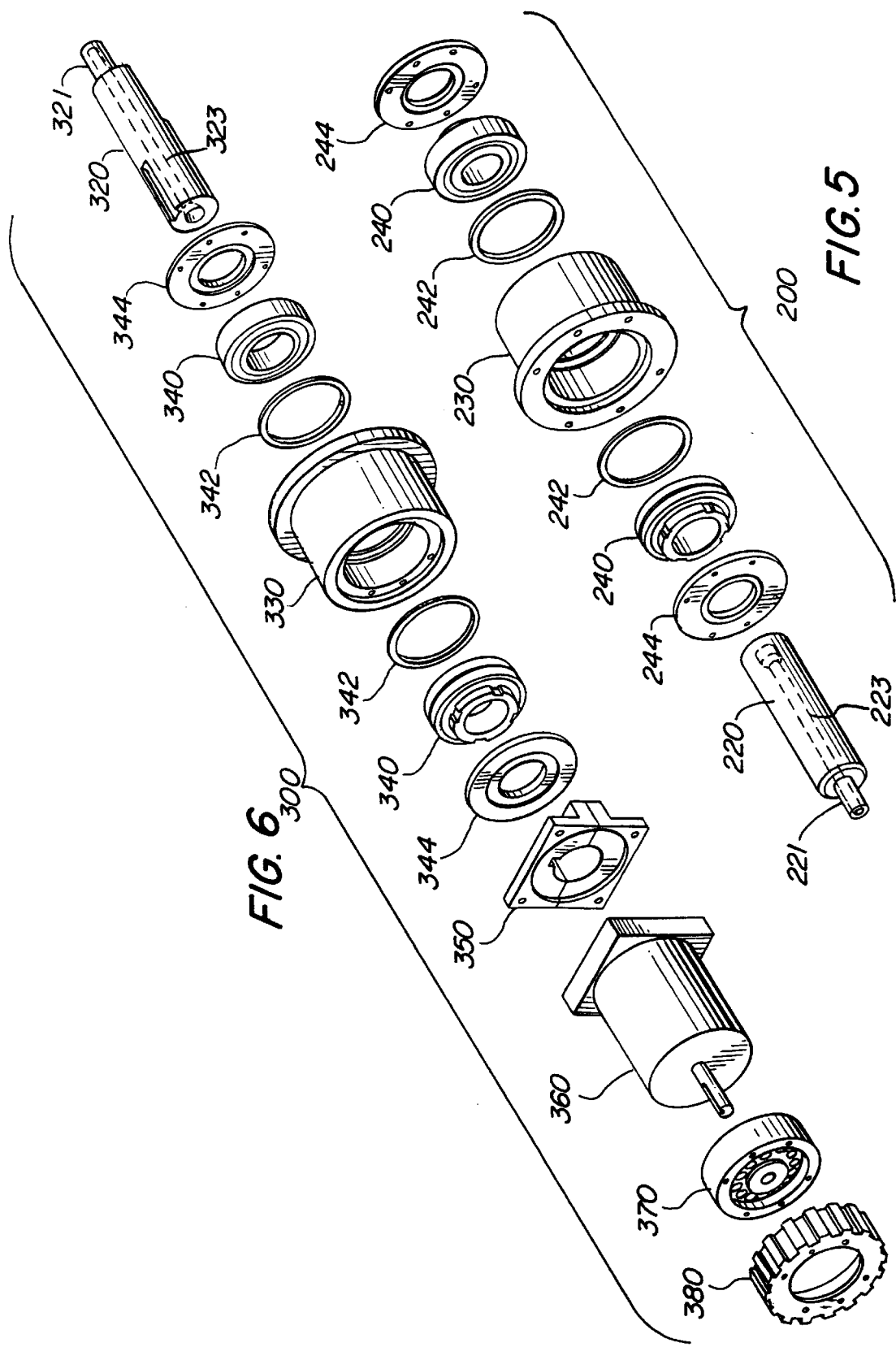

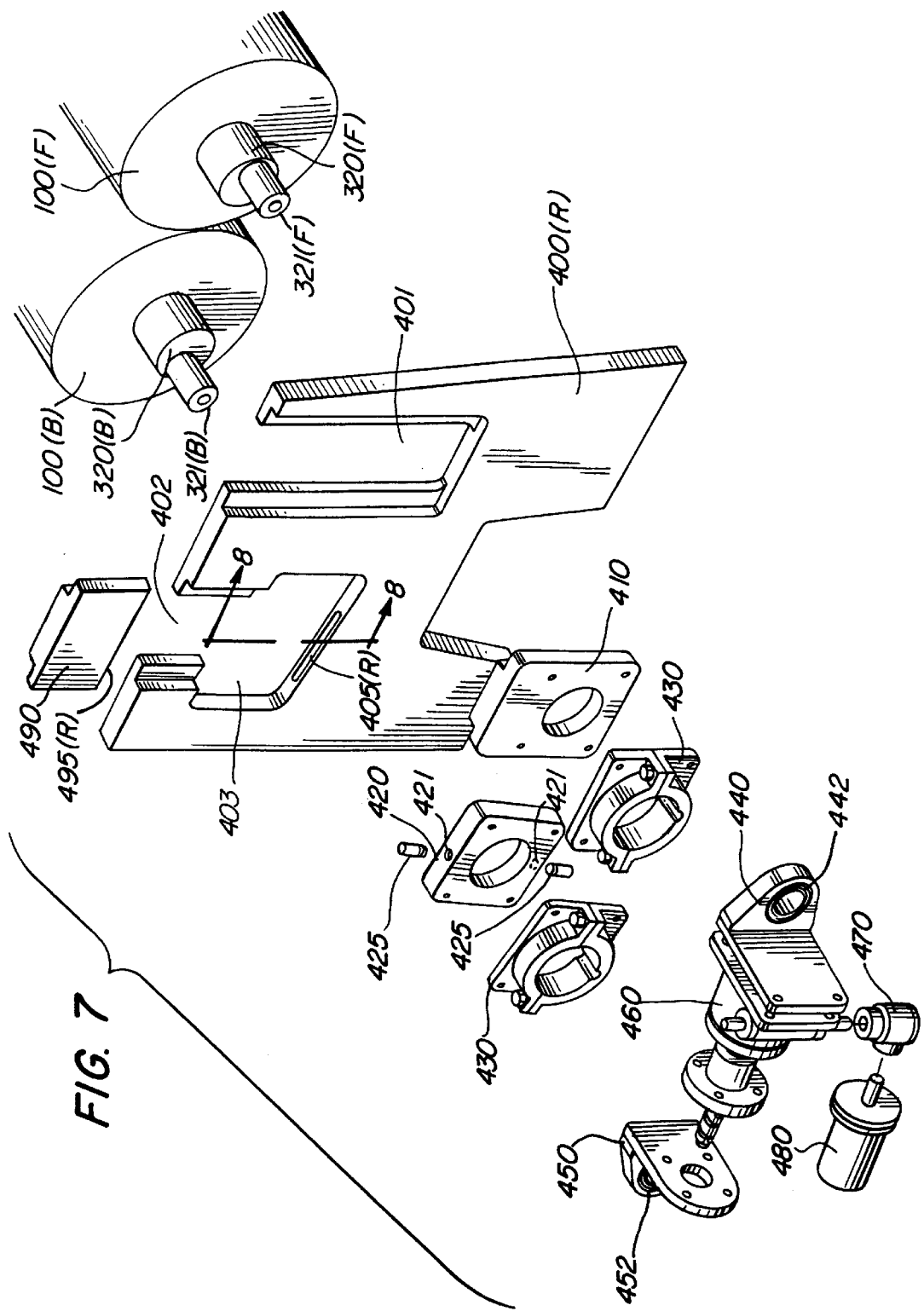

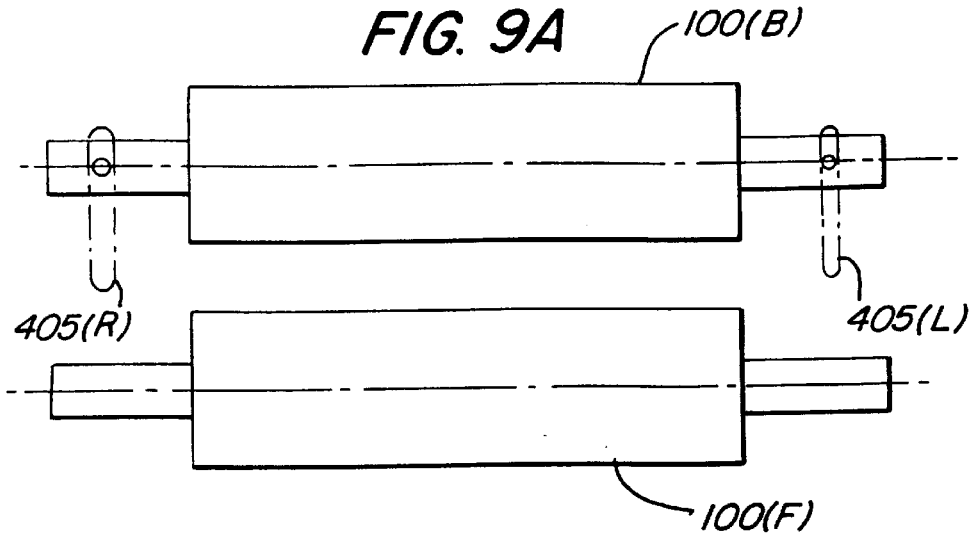
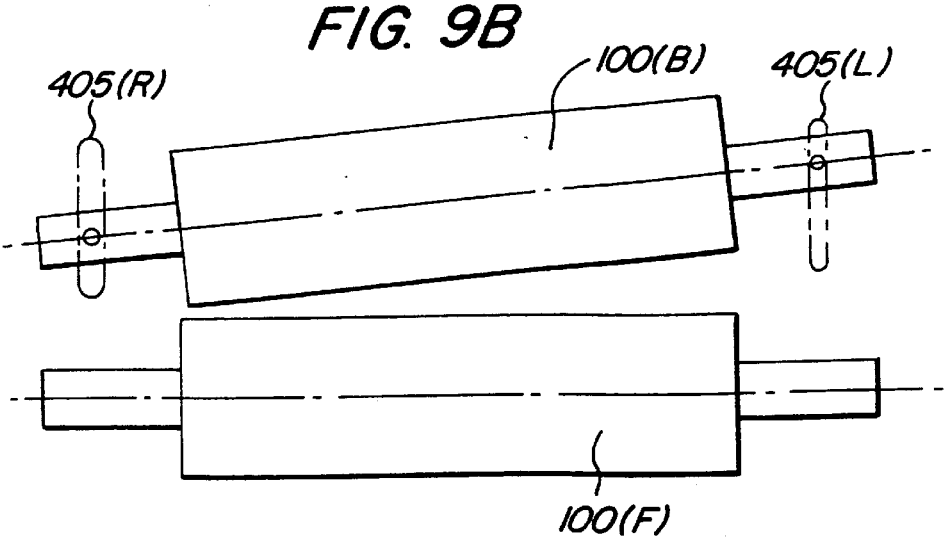
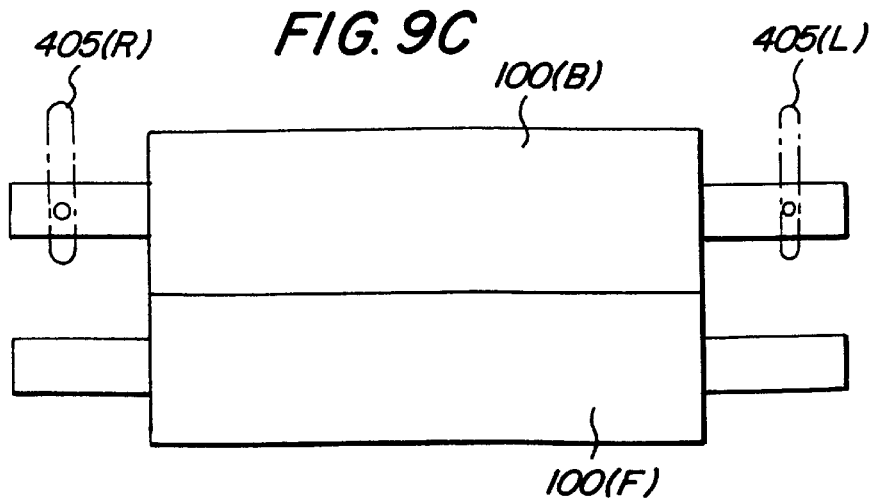

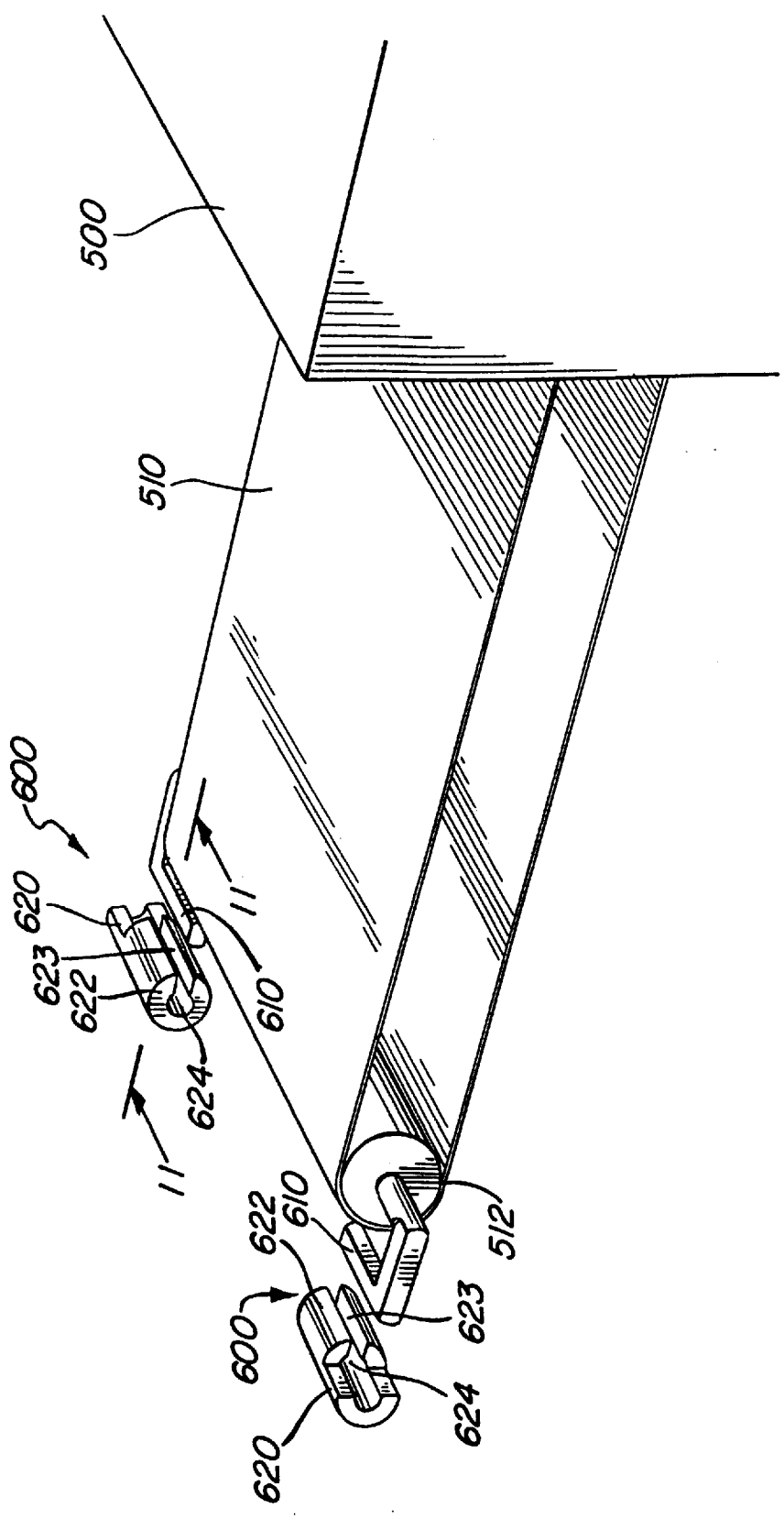

DOUGH SHEETER HAVING INDEPENDANT INTERNALLY-DRIVEN SELF-POWERED ROLLERS

This is a continuation of prior application Ser. No. 08/390,689, filed on Feb. 17, 1995 abandoned.

BACKGROUND OF THE INVENTION

1. Field of the Invention

The present invention relates generally to food processing machinery and, more specifically, to a dough sheeter for transforming a mass of dough into a dough sheet, said dough sheeter characterized by a pair of counterrotating rollers having internal drive means and external nonrotating shafts for easy adjustment of the pinch point between said rollers.

2. Description of Related Art

"Dough sheeters," also known as "sheeting heads," are used in the production of food products such as tortillas, pita bread, and corn chips. In a tortilla chip production line, for example, a sheeter head is located between a masa extruder which extrudes a mass of dough into the sheeter head and an oven which receives product units cut from the dough sheet.

FIG. 2A shows one example of a conventional sheeter head. As shown, a pair of counterrotating rollers 30, 40 are positioned to squeeze dough into a sheet from which product units are cut and transported forward on a conveyor belt assembly 60. The actual sheeting operation is best shown in FIG. 2B which, in side view, shows the dough 50 being squeezed between the rollers 30, 40 into a dough sheet 51. The pinch point 54 between the rollers 30, 40 is adjusted to vary the thickness of the dough sheet 51. Accordingly, one or both of the rollers 30, 40 must be movable. The dough sheet 51 is transferred from the pinch point 54 to only the front roller 40. A cutter roller 90 then cuts product units 52 from the dough sheet 51 in a cookie-cutter fashion. The dough sheet 51 is then stripped from the front roller 40 with a wire (not shown) whereby the product units 52 drop onto the conveyor belt assembly 60 and a web of unused material 53 ("rework") remains on the front roller 40.

The conventional sheeter head of FIG. 2A is detrimentally powered by large external drive components comprising, for example, a motor 70, a drive belt unit 72, a gear reducer assembly 74, and a coupling 76 to the front roller 40. The rear roller 30 is typically slaved to the front roller 40 with gears (not shown). The external drive units 70, 72, 74, 76 are unnecessarily large and bulky, making it relatively difficult to adjust the pinch point 54 between the rollers 30, 40.

A further problem associated with the conventional sheeter head of FIG. 2A is associated with the conveyor belt assembly 60. As shown, the conventional conveyor belt assembly 60 is an integral part of the sheeter head. As a result, when workers move the sheeter head for cleaning or repair, they often use the frame of the conveyor belt assembly 60 as a handle. Accordingly, it has been necessary to overengineer the conveyor belt assembly 60 to prevent damage during movement. This raises the cost of the machine. Moreover, the sheeter head may still be damaged by overzealous employees. Additionally, the extending conveyor belt assembly 60, even if not misused as a handle, may get in the way when the machine is being moved for cleaning or repair.

An even additional problem with the conventional sheeting head relates to the actual adjustment of the pinch point 54. Typically, adjustment is periodically made by manual means. Accordingly, an operator must periodically inspect the thickness of the dough sheet 51 and thereafter make a manual adjustment to the pinch point 54. A large amount of unacceptable product may pass through the sheeter head before an unacceptably thin or thick dough sheet 51 is noticed. The external drive connections mentioned above make it relatively difficult to implement an automatic adjustment.

A conventional sheeter head, such as that shown in FIG. 2A, is also troublesome to disassemble and repair. Again, the external drive components are the reason. Such a unit makes it relatively difficult to decouple the rollers 30, 40 for removal and repair.

OBJECTS AND SUMMARY OF THE INVENTION

In view of the above-noted problems associated with the prior art, it is an object of the present invention to provide an improved sheeter head assembly having internally-driven self-powered rollers.

It is a further object of the present invention to provide internally-driven self-powered rollers which are independently controlled to rotate at a variable speed relative to one another to help provide for dough separation from a back roller to a front roller without requiring a stripper wire on the back roller.

It is a further object of the present invention to eliminate the external drive components associated with conventional sheeter heads, and thereby simplify the adjustment of the pinch point between the sheeter rollers.

It is a further object of the present invention to provide an easier to clean, more sanitary sheeter head by minimizing external componentry that ordinarily collects food particles.

It is a further object of the present invention to provide internally-driven self-powered rollers having external nonrotating shafts which may be easily moved or positioned for removal, repair, and pinch point adjustment purposes.

It is a further object of the present invention to provide a sheeter head assembly wherein a discharge conveyor is releasably connected to the sheeter head.

It is a further object of the present invention to provide a sheeter head with an improved automatic adjustment means for controlling the thickness of the resulting dough sheet.

BRIEF DESCRIPTION OF THE DRAWINGS

A sheeter head according to the present invention may be best understood with reference to the following drawings, of which:

FIG. 1 is a perspective view of a sheeter head 10 according to the present invention shown in operative relationship with an oven 500 and a releasably connectable discharge conveyor assembly 510 according to the present invention;

FIG. 2A is a perspective view of a conventional sheeter head having external drive components 70, 72, 74, 76 that drive both sheeter rollers 30, 40 and a fixed nondetachable discharge conveyor assembly 60;

FIG. 2B is a cross-sectional side view of the conventional sheeter head of FIG. 2A illustrating the sheeting process;

FIG. 3 is a cross-sectional side view of an internally-driven self-powered roller 100(F) or 100(B) used in the present invention;

FIG. 4 is a exploded perspective view of the internally-driven self-powered roller 100(F) or 100(B) of FIG. 3;

FIG. 5 is an exploded perspective view of an idle hub assembly 200 of FIG. 4;

FIG. 6 is an exploded perspective view of a drive hub assembly 300 of FIG. 4;

FIG. 7 is an exploded perspective view of a right side plate assembly 400(R) and related components which provide for adjustment of a pinch point between the sheeter rollers 100(F), 100(B);

FIGS. 9A, 9B, and 9C are top plan views of the rollers 100(F), 100(B) during a pinch-point adjustment operation which demonstrate how the wider peg slot 405(R) prevents binding in the event that one end of the back roller 100(B) is driven ahead of or behind the other end;

FIG. 10 is a functional perspective view of a presently preferred releasable connection between a sheeter head 10 according to the present invention and a releasably connected conveyor belt assembly 510.

DETAILED DESCRIPTION OF THE PREFERRED EMBODIMENTS

Figure 8A:
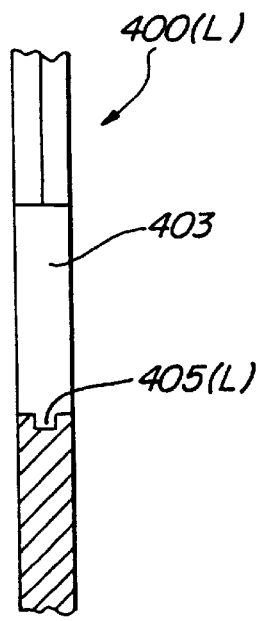
FIGS. 8A and 8B are cross-sectional views of peg grooves 405(L) and 405(R) formed in respective side plates 400(L) and 400(R)

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a dough sheeter having independent internally-driven self-powered rollers.

A sheeter head 10 according to the present invention is best understood with initial reference to FIG. 1. The sheeter head 10 is comprised of left and right side plates 400(L), 400(R), and a pair of counterrotating rollers, a front roller 100(F) and back roller 1000(B). The sheeter head 10 preferably resides on a base 20 which is conventionally supported by a plurality of casters 22. The sheeter head 10 is positioned to discharge product onto a discharger conveyor assembly 510, which takes the product into an oven 500 for baking. The actual sheeting process is explained earlier with reference to FIG. 2B. The additional components identified in FIG. 1 will be described below in connection with the other figures.

A hallmark of the sheeter head 10 of the present invention is its internally-driven self-powered rollers, best shown in FIGS. 3–6. FIG. 3 is a cross-sectional view of a preferred internally-driven roller 100(F) or 100(B) which illustrates its various components. The primary components are a roller tube 101, a drive hub assembly 300 on one end of the roller tube, and an idle hub assembly 200 on the other end. The hub assemblies 200, 300 respectively comprise a stub axle 222, 320, a hub 230, 330, and a bearing assembly 240, 340. The stub axles 220, 320 are preferably fixed, nonrotating members around which the roller tube 101 rotates. The bearing assemblies 240, 340 located inside the hubs 230, 330 allow for such rotation.

As best shown in FIG. 4, a drive spline 380 is preferably used to connect the drive hub assembly 300 to an internal spline 102 of the roller tube 101. This splined arrangement allows the drive hub assembly 300 to be easily connected to the roller tube 101 during assembly and removed therefrom for repair.

FIG. 6 is an exploded perspective view of the drive hub assembly 300. The drive hub assembly 300 is generally comprised of a hub 330 which rotates on a pair of bearing assemblies 340 around a fixed, nonrotating stub axle 320. The preferred bearing assemblies 340 are inserted into opposite sides of the hub 330 along with respective retaining rings 342 that engage slots 332 and bearing seals 344. An electric motor 360 is connected to the stub axle 320 with an adaptor plate 350. The preferred adaptor plate 350 is a " C-face plate" that mates with a conventional mounting surface on the rear of the motor 360. The motor 360 is operatively connected to a pancake gear 370 which, in turn, is connected to the drive spline 380, to internally drive the roller tube 101 and the hub 330 around the motor 360 and the fixed stub axle 320. The preferred motor 360 is a standard, self-contained motor. The inventors contemplate, however, the use of a "wound rotor" drive assembly wherein a stator system would reside on a single continuous shaft and the rotor system would reside inside of the roller tube.

The preferred motor 360 is a 5 horsepower, 3450 rpm, three-phase electric motor manufactured by Baldor Electric, Model No. T06F255W9009. The preferred pancake gear 370 is manufactured by Harmonic Drive Technologies, Model No. HDR 65. As shown in FIGS. 3–6, the drive stub axle 320 preferably includes a passageway 323 through which the electrical wires for the motor 360 may pass, and the idle stub axle 220 includes a similar passageway 223. The passageways 223, 323 will serve as the input and the output of a path for cooling air.

A motor speed control system (not shown) is implemented using conventional devices, such as inverters, to independently control the motors 360, 360 in the front and rear rollers 100(F), 100(B). The back roller 100(B), for example, may be caused to rotate 50% faster than the front roller 100(F) to aid in transferring the dough sheet from the back roller 100(B) to the front roller 100(F).

FIG. 5 is an exploded perspective view of the idle hub assembly 200. As shown, the idle hub assembly 200 is comprised of a hub 230 which rotates on a pair of bearing assemblies 240 around a fixed, nonrotating stub axle 220. The bearing assemblies 240, like their similarly-numbered counterparts in the drive hub assembly 300, are inserted into opposite sides of the hub unit 230 after a pair of retaining rings 242 which engage internal slots 232. The bearings 240 are then sealed with bearing seals 244.

Figure 8B:
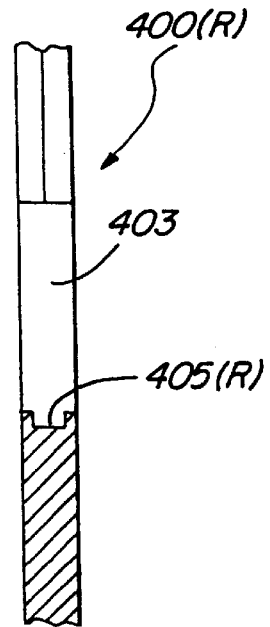

FIG. 7 is an exploded perspective view which illustrates the preferred interconnection between the front roller 100 (F), the back roller 100(B), and the right side plate 400(R). The interconnection at the left side plate 400(L) is a mirror image of that shown in FIG. 7 except for the width of the peg groove 405(L), as illustrated in FIGS. 8A and 8B. As shown, the preferred side plate 400(R) includes a front axle guide plate slot 401 and a vertical slot 402 which leads to a back axle slider plate opening 403. The front axle guide plate slot 401 is sized to receive a front axle guide plate 410 which has an aperture 412 through which the front roller's drive stub axle 320(F) extends. The drive stub axle 320(F) is thereafter secured in an axle clamp 430.

The back axle slider plate opening 403 is similarly sized to receive a rear axle slider plate 420. The rear axle slider plate 420 also includes an aperture 422 through which the back roller's drive stub axle 320(B) extends. The stub axle 320(B) is thereafter secured in another axle clamp 430. The preferred rear axle slider plate 420 includes a pair of apertures 421 which receive pegs 425. The pegs 425 engage a peg groove 405(R) in a bottom of the back axle slider plate opening 403 and a slot 495(R) in the bottom of a filler plate 490 at the top of the back axle slider plate opening 403. By such arrangement, the rear axle slider plate 420 can slide back and forth within the opening 403 to adjust the pinch point between the front roller 100(F) and the back roller 100(B).

As shown in FIG. 7 and also in FIGS. 3–6, the stub axles 220, 320 preferably include an extending eccentric journal 321(F), 321(B). The purpose of the eccentric journals 321(F), 321(B) is best understood with continued reference to FIG. 7. As shown, the front roller's eccentric journal 321(F) extends through one axle clamp 430 into a front mounting bracket 440, and the back roller's eccentric journal 321 extends through the other axle clamp 430 into a back mounting bracket 450. The mounting brackets 440, 450 include spherical bearings 442, 452 that allow them to rotate relative to the eccentric journals 321. A screw jack 460, preferably driven by a stepper motor 480 via a right angle gear box 470, is connected between the mounting brackets 440, 450. As a result, the driven movement of the screw jack 460 varies the distance between the mounting brackets 440, 450 and, by way of the eccentric journals 321(F), 321(B), the pinch point between the front roller 100(F) and the back roller 100(B). The eccentric journals 321 beneficially provide more distance between the stub axles 320(F), 320(B), thereby allowing the screw jack 460 to fit therebetween and provide for economy of space. The mounting brackets 440, 450 could, of course, be mounted directly to the drive shafts 320(F), 320(B) if a screw jack 460 was available in a size sufficiently small to fit therebetween.

As already described, the rear axle slider plate 420 slides back and forth in the grooves 405, 495 with pegs 425. Because a preferred sheeter head 10 according to the present invention encompasses separate internally-driven screw jacks 460 on either side, it is possible that one end of the back roller 100(B) may be driven at a different rate than the other. Accordingly, it is possible that the pegs 425 may bind in the respective peg grooves. In order to minimize that possibility, the present invention comprises one peg groove 405(L) which closely fits the pegs and another peg groove 405(R) which is wider than the pegs. FIGS. 8A and 8B illustrate the relative width of the preferred grooves. As shown, the groove 405(L) of the left slide plate 400(L) is relatively narrow as compared to the groove 405(R) of the right slide plate 400(R).

As a result of the relatively wide groove 405(R), there is little chance that the back roller 100(B) will bind when being moved by the screw jacks 460, even if there is some skewing. FIGS. 9A, 9B, and 9C illustrate a possible movement of the back roller 100(B) during a pinch-point adjustment operation. As shown, when the pinch point is being narrowed from FIG. 9A to FIG. 9B, no binding will occur even if the back roller 100(B) begins to skew, because the wide groove 405(R) provides some forgiving allowance.

Figure 11:
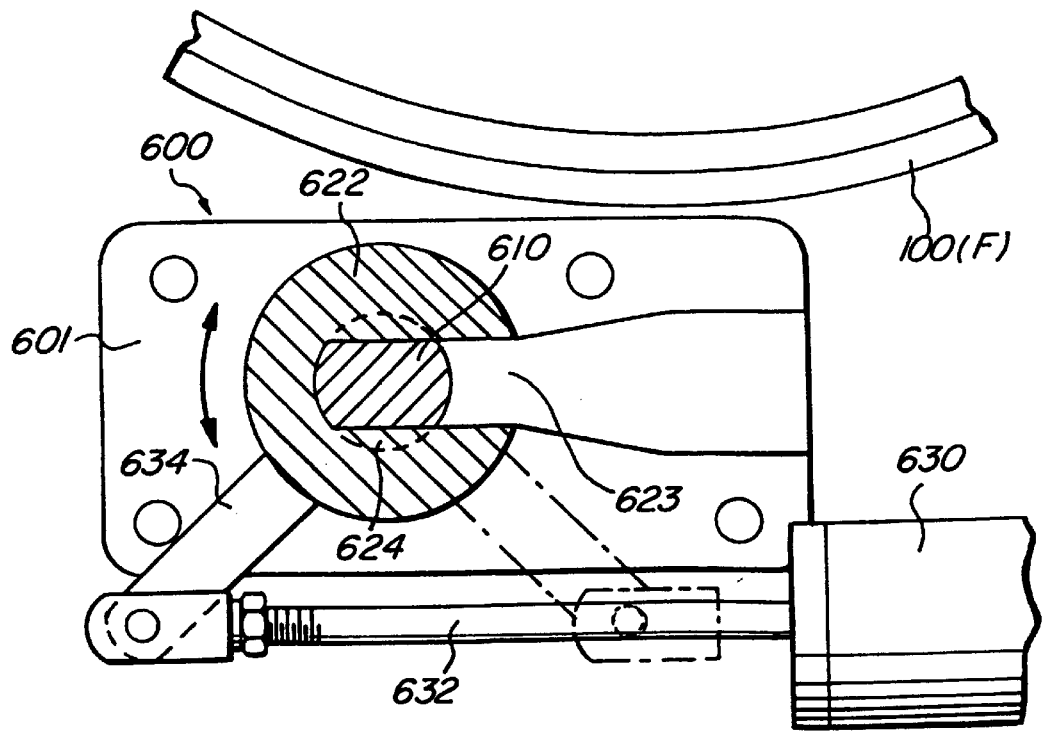
FIG. 11 is a cross-sectional side view of the releasable connection assembly 600 of FIG. 10.

A further aspect of a sheeter head 10 according to the present invention are the releasable connection assemblies 600 shown roughly in FIG. 1 and, in more detail, in FIGS. 10 and 11. The releasable connection assemblies 600 releasably connect the sheeter head 10 to a discharge conveyor assembly 510 which leads to an oven 500. The releasable connection assemblies 600 beneficially eliminate the need to move the sheeter head 10 with the discharger conveyor assembly 510. This minimizes the working size of the sheeter head 10 and prevents a worker from using the discharge conveyor assembly 510 as a movement handle.

FIG. 10 illustrates a presently preferred releasable connection assembly 600. As shown, a releasable connection assembly 600 is preferably comprised of a U-shaped mounting bracket 610 having an attachment arm connected to a leading end 512 of the conveyor belt assembly 510 and a substantially C-shaped locking assembly 620 which mates with the U-shaped bracket 610. The C-shaped locking assembly is comprised of an inner end 622 having a slot 623 which leads to an aperture 624. The slot 623, as suggested by FIG. 10, receives the U-shaped bracket 610. The C-shaped locking assembly 620 is thereafter rotated whereby the U-shaped bracket 610 is secured within the aperture 624.

FIG. 11 is a cross-sectional view of the left side of the releasable connection assembly 600 of FIG. 10. As shown in FIG. 11, the releasable connection assembly is preferably driven with an air cylinder 630 which moves a rod 632 and an attached lever 634 back and forth between a locked position and an unlocked position. The lever 634, in turn, moves the locking assembly 620 back and forth, as suggested by the arrow of FIG. 11. There are, of course, other releasable locking assemblies possible that could be used without departing from the invention of a sheeter head having a releasable connection with a discharge conveyor.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A sheeting head for transforming a mass of dough into a dough sheet comprising:

a frame having side plates;

a pair of slider plates which slidably engage the side plates of said frame;

first and second pairs of nonrotating stub axles;

means for nonrotatably mounting the first pair of nonrotating stub axles to the side plates of said frame to extend inwardly toward one another, means for nonrotatably mounting the second pair of nonrotating stub axles to said pair of slider plates;

first and second hollow sheeting rollers that are rotatably held between the first and second pairs of nonrotating stub axles respectively, in a substantially parallel, spaced arrangement to form a pinch point;

first and second independent drive means located inside of corresponding ones of said hollow sheeting rollers for independently driving said hollow sheeting rollers around the nonrotating stub axles and in counterrotation to one another to transform the mass of dough into the dough sheet in the pinch point;

means for independently controlling said first and second independent drive means to independently drive said hollow sheeting rollers at variable speeds relative to one another for transferring the dough sheet from said first roller to said second roller downstream of the pinch point; and means for adjusting the pinch point by moving said pair of slider plates to move the second pair of nonrotating stub axles nonrotatably mounted thereto without restriction by any rotation of said second pair of nonrotating stub axles or any mechanical drive connection between the first and second hollow sheeting rollers.

2. The sheeting head of claim 1 wherein said first and second drive means respectively compromise:

a planetary gear assembly located inside of and having an output connected to a respective hollow sheeting roller; and an electric motor located inside of the respective hollow sheeting roller, said electric motor having a back end affixed to one of said stub axles and a shaft extending from a front end that is connected to an input of said planetary gear assembly.

3. The sheeting head of claim 2 wherein both of said nonrotating stub axles have elongated apertures for providing power to said electric motor and for providing a passageway for cooling air.

4. The sheeting head of claim 1 wherein said means for adjusting the pinch point comprises:

an eccentric journal located on each of said first and second pairs of nonrotating stub axles;

a pair of screw jacks mounted between a back one and a front one of a spaced pair of said eccentric journals on opposite sides of said frame; and means for rotating said screw jacks to adjust the pitch point by moving the back one of said sheeting rollers to relative to the front one of said sheeting rollers.

pair of screw jacks mounted between a back one and a front one of a spaced pair of said eccentric journals on opposite sides of said frame; and means for rotating said screw jacks to adjust the pitch point by moving the back one of said sheeting rollers to relative to the front one of said sheeting rollers.

5. The sheeting head of claim 1 further comprising:

a conveyor belt assembly; and means for releasably attaching said conveyor belt assembly to the frame and next to a discharge area of the first and second hollow sheeting rollers.

6. The sheeting head of claim 5 wherein said means for releasably attaching comprises:

an attachment arm located at an end of said conveyor belt assembly;

a C-shaped retaining member affixed to the frame and defining a slot which receives the attachment arm; and means for rotating the C-shaped retaining member to secure the attachment arm.

7. A sheeting head comprising:

a frame;

front and rear nonrotating shafts attached to said frame;

front and rear rollers rotatably secured to said front and rear shafts;

means for slidably moving at least one of said front and rear nonrotating shafts to adjust a pinch point between the front and rear rollers and thereby control a width of the dough sheet wherein said means for slidably moving comprises:

a pair of opposed slider openings in said frame having upper and lower slider grooves and wherein the slider grooves on one side of said frame are wider than the slider grooves on the other side of said frame to accommodate any skewing movement associated with the movement of said at least one roller, a pair of slider plates receiving the nonrotating shafts of said at least one roller and having upper and lower apertures the slider plates respectively fitting into said pair of opposed slider openings with the upper and lower apertures of said slider plates facing the upper and lower slider grooves of said slider openings; and a plurality of pegs said pegs extending from the upper and lower apertures of said slider plates into the upper and lower grooves of said slider openings.

8. The sheeting head of claim 7 wherein said front and rear nonrotating shafts are respectively comprised of a pair of nonrotating stub axles.

9. The sheeting head of claim 1 wherein each pair of nonrotating stub axles is comprised of two separate axles which partially extend into the corresponding hollow sheeting roller.

10. The sheeting head of claim 1 wherein each pair of nonrotating stub axles is comprised of opposite ends of a single axle which extends through the corresponding hollow sheeting roller.

* * * * *